US007057555B2

(12) United States Patent
Lewis

(10) Patent No.: US 7,057,555 B2
(45) Date of Patent: Jun. 6, 2006

(54) WIRELESS LAN WITH DISTRIBUTED ACCESS POINTS FOR SPACE MANAGEMENT

(75) Inventor: Michael E. Lewis, Hartville, OH (US)

(73) Assignee: Cisco Technology, Inc., San Jose, CA (US)

( * ) Notice: Subject to any disclaimer, the term of this patent is extended or adjusted under 35 U.S.C. 154(b) by 333 days.

(21) Appl. No.: 10/305,570

(22) Filed: Nov. 27, 2002

(65) Prior Publication Data

US 2004/0102157 A1 May 27, 2004

(51) Int. Cl.
*H01Q 3/26* (2006.01)
(52) U.S. Cl. .................................................. 342/372
(58) Field of Classification Search ................ 342/372, 342/377, 373; 455/63.4, 25, 562.1, 41.2, 455/41.3
See application file for complete search history.

(56) References Cited

U.S. PATENT DOCUMENTS

| | | | | |
|---|---|---|---|---|
| 6,002,360 | A * | 12/1999 | Wolcott et al. | 342/372 |
| 6,584,302 | B1 * | 6/2003 | Hottinen et al. | 455/562.1 |
| 6,785,513 | B1 * | 8/2004 | Sivaprakasam | 455/63.1 |
| 2001/0033248 | A1 * | 10/2001 | Owechko | 342/371 |
| 2002/0057660 | A1 * | 5/2002 | Park et al. | 375/142 |
| 2002/0058502 | A1 * | 5/2002 | Stanforth | 455/517 |
| 2002/0111174 | A1 * | 8/2002 | Judson et al. | 455/456 |
| 2004/0066762 | A1 * | 4/2004 | Alastalo | 370/329 |
| 2004/0082299 | A1 * | 4/2004 | Brunner et al. | 455/562.1 |

FOREIGN PATENT DOCUMENTS

| | | |
|---|---|---|
| WO | WO 02/063836 | 8/2002 |
| WO | WO 02/082752 | 10/2002 |
| WO | WO 02/087096 | 10/2002 |

OTHER PUBLICATIONS

K. Yao et al., Blind beamforming on a randomly distributed sensor array system, IEEE Journal on Selected Areas in Communications, vol. 16(8), p. 1555-1567, Oct. 1998.*

(Continued)

*Primary Examiner*—Thomas H. Tarcza
*Assistant Examiner*—Fred H Mull
(74) *Attorney, Agent, or Firm*—Tucker Ellis & West LLP

(57) ABSTRACT

A directional antenna system is disclosed in which a plurality of RF nodes are provided for cooperatively forming a directional antenna array for transmitting and receiving wireless signals between a wireless client at a predetermined position in space. One or more network interface assemblies are provided for exchanging signals between the plurality of RF nodes and a network. Preferably, the plurality of RF nodes are distributed in space with respect to each other and the network interface assembly. The network interface includes a beamformer for applying a plurality of antenna weighting factors to the respective RF nodes, for introducing phase differences in the respective transmitted and received wireless signals that produce a directional steering vector for the wireless signals. In one embodiment of the invention, a processing arrangement is provided for deriving an array manifold, which includes a respective plurality of antenna weighting factors corresponding respectively to distances between each of the plurality of RF nodes, for producing the directional steering vector for the wireless signals. In another embodiment of the invention, a subspace beamforming arrangement is provided for building a covariance matrix from sampled values of a wireless client signal at each RF node, and deriving dominant eigenvectors corresponding to each RF node. The dominant eigenvectors are used as the respective antenna weighting factors for producing the directional steering vectors for the wireless signals.

8 Claims, 2 Drawing Sheets

OTHER PUBLICATIONS

K. Yao et al., Array signal processing for a wireless MEM sensor network, IEEE Workshop on Signal Processing Systems, p. 11-20, Oct. 1998.*

M.A. Zatman et al., Spatial rangefinding and spectral resolution of df/dt, IEE Colloquium on New Directions in Adaptive Signal Processing, p. 12/1-12/4, Feb. 1993.*

E. Gonen et al., "Subspace-Based Direction Finding Methods" in Digital Signal Processing Handbook, edited by V.K. Madisetti et al, CRC Press LLC, 1999.*

C.-Y. Tseng et al., Estimation of signal steering vectors in uncalibrated arrays, Conference Record of The Twenty-Seventh Asilomar Conference on Signals, Systems and Computers, vol. 2, p. 1062-1066, Nov. 1993.□□.*

B. Ananthasubramaniam et al., Distributed space-time communication for sensor networks, First International Symposium on Control, Communications and Signal Processing, p. 195-198, 2004.*

G. Barriac et al., Distributed beamforming for information transfer in sensor networks, Third International Symposium on Information Processing in Sensor Networks, p. 81-88, Apr. 2004.*

H. Ochiai et al., Collaborative beamforming in ad hoc networks, IEEE Information Theory Workshop, p. 396-401, Oct. 2004.*

International Search Report mailed May 26, 2004 related to PCT/US03/36719 filed Nov. 17, 2002.

* cited by examiner

WIRELESS LAN WITH DISTRIBUTED ACCESS POINTS FOR SPACE MANAGEMENT

CROSS REFERENCE TO RELATED APPLICATIONS

This application is related to U.S. patent application Ser. No. 09/949,697, filed: Sep. 10, 2001, and assigned to Cisco Technology. Inc., the assignee of this application.

BACKGROUND OF THE INVENTION

The present invention is directed to the field of wireless local area networks, particularly those of the type that employ an adaptive directional antenna array for space management. With the increase in wireless traffic, the wireless spectrum has become increasingly crowded, and the task of frequency management becomes more difficult. Unfortunately, a typical deployment uses only omnidirectional antennas and protocol methods to manage a network, which have limitations that permit only limited improvements in performance. Thus, management of space is becoming increasingly important, and promises to improve network capacity, scalability, and quality of service (QoS) performance, and reduce deployment complexity.

Space management can be addressed by an adaptive directional antenna array, which can be used to selectively steer a beam in the direction of a desired wireless client. Similarly, nulls in the antenna pattern can be created to reduce unwanted interference. The management of space using antenna arrays promises to enable far greater wireless network performance than currently available technology.

Many existing antenna array arrangements require a package in which an access point, having one or more antennas, is connected to a network. However, such packages are usually small and not extensible and not capable of spatial management. A number of these access points might be used to obtain a sufficient coverage area but are limited in the amount of capacity they can provide. Also, these access points, at the end of the Ethernet cable have the full complement of AP hardware making them unnecessarily large, complex and expensive.

SUMMARY OF THE INVENTION

The difficulties and drawbacks of previous-type schemes are resolved by the directional antenna system of the present invention in which a plurality of RF nodes are provided for cooperatively forming a directional antenna array for transmitting and receiving wireless signals between a wireless client at a predetermined position in space. One or more network interface assemblies are provided for exchanging signals between the plurality of RF nodes and a network. Preferably, the plurality of RF nodes is distributed in space with respect to each other and the network interface assembly. The network interface includes a beamformer for applying a plurality of antenna weighting factors to the respective RF nodes, for introducing phase differences in the respective transmitted and received wireless signals that produce a directional steering vector for the wireless signals. In one embodiment of the invention, a processing arrangement is provided for deriving an array manifold, which includes a respective plurality of antenna weighting factors for producing the directional steering vector for the wireless signals. The array manifold can, along with an appropriate algorithm, be use to perform "location based services" by determining the angle of arrival of a client signal impingent on the array. In another embodiment of the invention, a subspace beamforming arrangement is provided for building a covariance matrix from sampled values of a wireless client signal at each RF node, and deriving dominant eigenvectors. The dominant eigenvectors are used as the respective antenna weighting factors for producing the directional steering vectors for the wireless signals.

Using an arrangement such as this in a dense network where the RF node density is greater than the density of a network designed using conventional AP's it is possible to enable aggressive space management and location based services.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

Figure 1A:
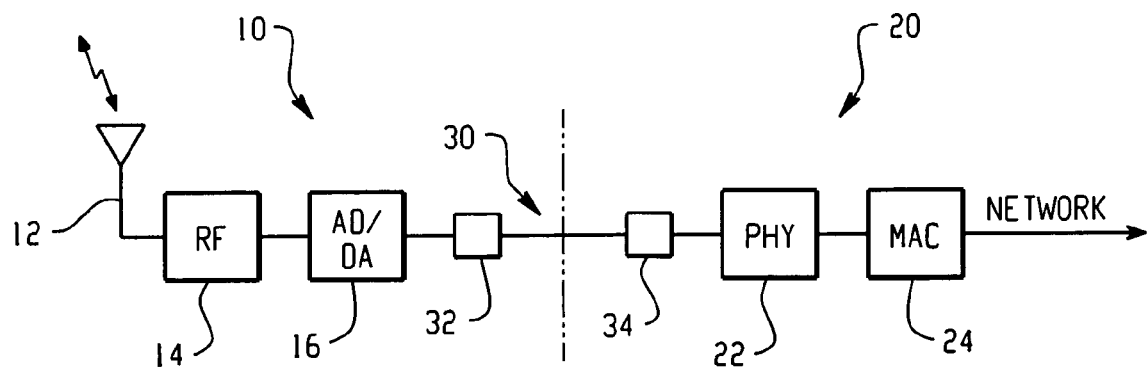
FIGS. 1A and 1B respectively show a partitioned access point as implemented in accordance with the present invention.
Figure 1B:
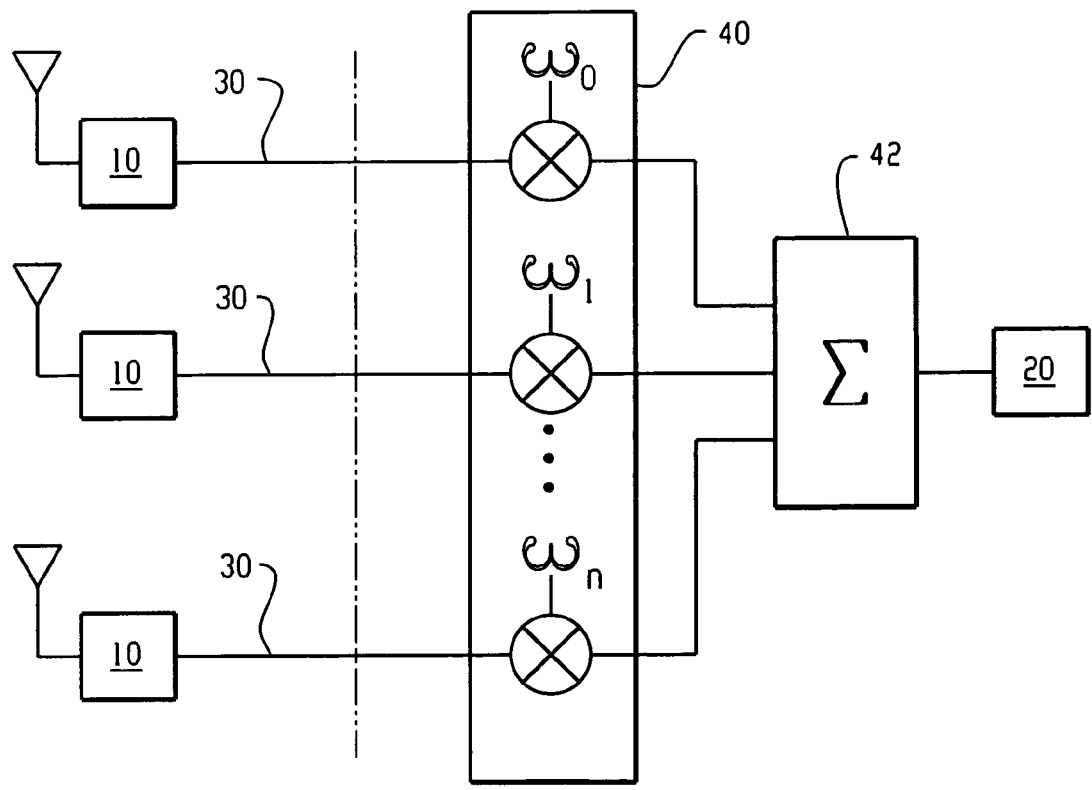

In the present invention, a wireless LAN is contemplated in which the function of the access points are partitioned, with the radio components distributed in space over a coverage area, and implemented in such a way as to form an adaptive directional antenna array. As shown in FIGS. 1A and 1B, the present directional antenna system includes a plurality of RF nodes 10 that cooperate with a separate and distinct network interface assembly 20. As shown in FIG. 1A, each RF node 10 can cooperate with a single network interface 20. Also, as shown in FIG. 1B, a number of RF nodes 10 can all be configured to cooperate with a single network interface 20. In a single system, any number of RF nodes 10 can cooperate with any respective number of network interfaces 20, as is practicable. In any event, the plurality of RF nodes 10 cooperatively form a directional antenna array for transmitting and receiving wireless signals between a wireless client at a predetermined position in space. It should be appreciated that a directional antenna can "steer" signal beams between the client and the array, as well as steer signal "nulls" toward potential sources of interference. The techniques for steering will be set forth in greater detail below. The network interface assembly 20 is configured to exchange signals between the plurality of RF nodes 10 and the network.

As is especially shown in FIG. 1A, each RF node 10 includes an antenna 12 for transmitting and receiving wireless signals. A radio assembly 14 is provided, including a local oscillator, for respectively modulating and deregulating the transmitted and received wireless signals. In the preferred embodiment, the radio assembly 14 is preferably a superheterodyne radio. For a 5 GHz radio signal, the local oscillator is tuned to output a 20 MHz intermediate frequency. The radio assembly 14 can also include automatic gain control and start-of-packet (SOP) detection. A converter 16 is provided for converting the signals between analog wireless signals and digital network signals. The converter 16 is preferably a combined Analog/Digital, Digital/Analog signal converter, and includes a sampling clock. The converter 16 is preferably a 10-bit converter with a 100 MB/s sampling clock, thereby providing a throughput of 1 billion bits per second. In order to permit the plurality of RF nodes 10 to function as a directional antenna array, the respective local oscillators and sampling clocks in each RF node 10 are mutually coherent in frequency and phase. This allows weighting factors to be applied to each RF node 10 so as perform directional beamforming, as will be explained in detail below.

As also shown in FIG. 1A, the network interface assembly 20 includes a PHY layer 22, i.e. a base-band processor, provides signal modulation and demodulation, encoding and decoding and any other necessary functionality. A MAC layer 24 is provided for converting the exchanged signals respectively to and from a network protocol, e.g. Ethernet. In the preferred embodiment, the network interface assembly 20 can be maintained in a rack-mounted enclosure in a wiring closet. In the preferred embodiment, the plurality of RF nodes 10 are distributed in space with respect to each other and the network interface assembly 20. Each of the RF nodes 10 are connected to the network interface 20 by a wired connection 30, which is preferably a high-speed wire or a fiber link. The wired connection 30 simply acts as a "bit pipe" between the partitioned components 10, 20 with no protocol there between. A pair of transceivers 32, 34 are at either end of the wired connection, for providing any necessary gain between partitioned components 10, 20. The wired connection 30 for each RF node 10 can be at any sufficient length to provide for a desired coverage area, i.e. a building or other WLAN enterprise deployment.

As shown in FIG. 1B, the present invention includes a beamformer 40 for applying a plurality of antenna weighting factors ($\omega_0, \omega_1 \ldots \omega_n$) to the respective RF nodes, for introducing phase differences into the respective transmitted and received wireless signals, so as to produce a directional steering vector. In the "receive signal" operating mode, an adder 42 is used to combine the signals received from the beamformer 40, and forward to the network interface 20 for further processing. The adder 20 is only used in "receive" mode and is not used in "transmit" mode. Two embodiments are contemplated for determining suitable weighting factors: determining an "array manifold" and using "subspace beamforming."

Figure 2A:
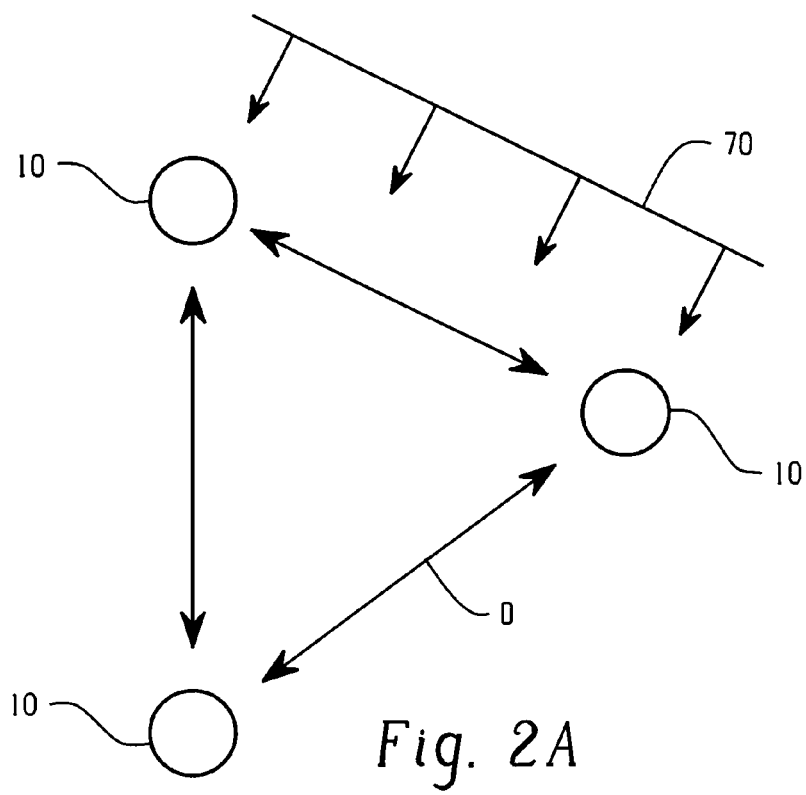
FIGS. 2A and 2B respectively show a local positioning system and a correlator as used in accordance with an embodiment of the present invention.
Figure 2B:
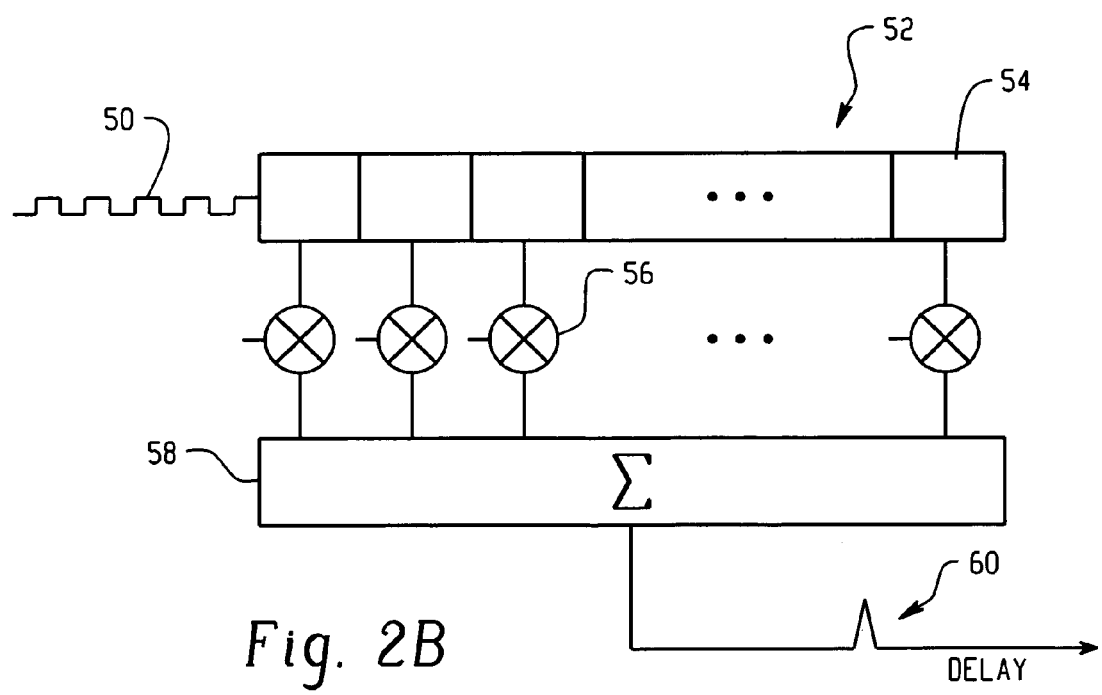

In the embodiment for determining an array manifold for the present array, one must determine the physical placement of the RF nodes 10 in space. This can be determined by a "local positioning system." As shown in FIG. 2A, for a given number of RF nodes 10, e.g. three, it is sufficient to know the relative positions of each node 10 with respect to each other. To determine these positions, each node 10 sends out a long correlation sequence signal that is received by each other node 10. As shown in FIG. 2B, the received correlation signal 50 is processed with a correlator 52, in order to cross-correlate the signal 50 with a copy maintained at the node 10. A plurality of delays 54 are provided so that a predetermined number of time-sequenced points in the correlation signal 50 can be processed in parallel. Each predetermined point is forwarded to a respective tap 56, which multiplies the respective point by the complex conjugate of the respective corresponding point maintained at the node 10. These products are added together with an adder 58, and the output represents a correlation signal. The correlator output has a peak 60 which corresponds to the time delay t in transmission between two respective nodes 10. Since the signal 50 travels at the speed of light c the distance D between two nodes is easily found from:

$$D = c \cdot t$$

And once the distances D are known between three nodes 10 as shown in FIG. 2A, a triangle is formed, and all other information such as angles for each corner can be easily derived from the principles of Euclidean geometry.

To further clarify this method first assume that the direction of a vector pointing from a first AP to second AP is known with respect to some fixed direction within the building in which the APs are located. Further assume that all AP's in the network are given the same global reference signal in order to derive the clocks and local oscillators. The distance between the APs can be determined very accurately by having the first AP continually transmit a long correlation sequence. This signal is received by the second AP and retransmitted along with information that determines the actual position of the correlation peak at the second AP. The additional timing information is determined by interpolation and is needed since the clock at the second AP may not have the same phase as the clock at the first AP. The first AP also uses interpolation to more finely measure the arrival time of the correlation sequence. At this time the round trip time is known and the distance between the AP's is known. The phase difference between the digital clocks at the two AP's is also known. If the local oscillators and the clocks at each AP are derived from the same global reference the relative phases between the local oscillators is known as well but must be refined. This method of finding distances between AP's in the network can be continued from AP to AP until the location of all AP's in the network are known. Using basic geometry and trigonometry, the whole network can be mapped. To further refine the array manifold the APs within the network can transmit a calibration signal one at a time. Since the locations of all the APs are known so is the direction of arrival of the calibration signals. Since the direction of arrival is known and there are several calibration signals, the array manifold can be further refined by the usual methods.

In order to determine the array weights $\omega_n$ for each node 10, it is necessary to perform a statistical matrix analysis for each client associated with the antenna array. The matrix analysis will be used in order to locate the direction of each client with respect to a coordinate system of the antenna array. In this way, the present invention will determine the values for the array weights used in the beamformer, to create phase differences that allow the steering of nulls towards interference sources and/or beams towards the desired clients. As generally indicated in FIG. 2A, a client is at a sufficient distance from the array that a signal wavefront 70 can be approximated as a plane wave. The measured signal strength E at each antenna element is expressed as:

$$\vec{E} = \vec{E}_o e^{-1(\omega t - \vec{k} \cdot \vec{r})}$$

where $\vec{r}$ is the observation point (i.e. antenna location) for measuring the field and $\vec{k}$ is the propagation wave vector, and $\vec{k} \cdot \vec{r}$ is the phase of the measured signal at the observation point. The signal phase observed at nodes 10 is:

$$\vec{k} \cdot \vec{r} = \frac{2\pi}{\lambda}(x\sin(\theta)\cos(\varphi) + y\sin(\theta)\sin(\varphi) + z\cos(\theta))$$

where λ is the wavelength of the client frequency f such that λ=c/f where c is the speed of light, and φ is the azamuthal angle and θ is the polar angle.

Each antenna element 12 is separated from each other by a distance d where an element 12 is located at the origin (x=0). Thus, for a linear array, each antenna element 12 will have a phase difference of signal reception such that:

$$\text{for } x = 0, \quad \vec{k} \cdot \vec{r} = 0;$$
$$\text{for } x = d, \quad \vec{k} \cdot \vec{r} = \frac{2\pi d}{\lambda}\cos(\varphi);$$
$$\text{for } x = 2d, \quad \vec{k} \cdot \vec{r} = \frac{4\pi d}{\lambda}\cos(\varphi);$$
$$\text{for } x = nd, \quad \vec{k} \cdot \vec{r} = \frac{n2\pi d}{\lambda}\cos(\varphi);$$

so that the total received signal strength for an n-element array 10 would be:

$$E_n \propto 1 + e^{-i\frac{2\pi d}{\lambda}\cos\varphi} + e^{-i\frac{4\pi d}{\lambda}\cos\varphi} + \ldots + e^{-i\frac{2n\pi d}{\lambda}\cos\varphi}$$

These phases are expressed by the array manifold vector defined as:

$$a(\varphi) = \left(1, e^{-i\frac{2\pi d}{\lambda}\cos\varphi}, e^{-i\frac{4\pi d}{\lambda}\cos\varphi}, \ldots, e^{-i\frac{2n\pi d}{\lambda}\cos\varphi}\right).$$

When the array is used in transmission, each node 10 is radiating in all directions. However, the phase differences between each node 10 are such that the received signal strength E located at an angle φ is the same as $E_n$ shown above. In order to transmit a signal toward a client located off-axis, e.g. 60°, it is necessary to adjust the phases of the nodes 10 so as to produce a signal maximum centered along φ=60°. This is accomplished in the beamformer 40 by applying suitable weighting factors $\omega_0, \omega_1, \omega_2, \ldots \omega_n$ to each respective node 10. This changes the phases of the RF signals transmitted from each antenna element to produce a signal E' such that:

$$E' = \omega_0 e^{-i0} + \omega_1 e^{-id\cos\varphi} + \ldots + \omega_n e^{-ind\cos\varphi}$$
$$\text{or } E' = \sum_0^n \omega_n e^{-id\cos\varphi}$$

By finding suitable weighting factors from the array manifold in the above-indicated manner, a signal beam can be steered in the direction of a client so as to provide a directional antenna array. Of course, any other methods that employ the array manifold can also be used to steer a beam and produce nulls, all of which could be used without departing from the present invention.

In the other respective embodiment, subspace beamforming can be used to determine suitable weighting factors. In this approach, complex baseband signals from the client are sampled at each node 10, so as to obtain "snapshots" of signals from a particular client. This can be done during the initial association of the client to the access point or during subsequent communications with the access point. The sampled signals X for a three element array are expressed in vector form as follows:

$$X^T = \{x_0, x_1, x_3\}.$$

The sampled signals are used to build up a "covariance matrix" R such that:

$$R = XX^H$$

i.e. R is the direct product of X and $X^H$, the Hermitian transpose of vector X. For a matrix, the Hermitian transpose is obtained by taking the transpose of the matrix followed by the complex conjugation of each element in the matrix. In the case of a vector, the original vector, if a column vector, is changed into a row vector followed by a complex conjugation of each element in the vector. In the case of a row vector, the transpose results into a column vector. For the purpose of our discussion a non-transposed vector is assumed to be a column vector. In this way, for a three-element antenna array, the covariance matrix is a 3×3 matrix such that:

$$x_0 x_0^* \quad x_0 x_1^* \quad x_0 x_2^*$$
$$x_1 x_0^* \quad x_1 x_1^* \quad x_1 x_2^*$$
$$x_2 x_0^* \quad x_3 x_1^* \quad x_2 x_2^*$$

where the values in this matrix are seen to be either auto-correlations or cross-correlations. The covariance matrix R is itself Hermitian, i.e. $R=R^H$, which is to say, if we take the Hermitian transpose of R, we get R back again.

After building up the covariance matrix of sampled values from the client signal, the covariance matrix undergoes an "eigen-decomposition" for determining eigenvalues and eigenvectors of the covariance matrix. The equation used for this is given by $$RV_i = \lambda_i V_i$$

where $V_i$ is the i'th eigenvector, R is the covariance matrix and $\lambda_i$ is the i'th eigenvalue. Of course, it is appreciated that there are as many eigenvalues i as there are rows or columns in the matrix, i.e. for an n×n matrix, there are n eigenvalues.

After the eigen-decomposition is performed, the eigenvalues and eigenvectors are recorded into a table. These eigenvectors are used as weights to produce the steering vector for forming the beam in the direction of the client. Note that one or more eigenvectors corresponding to the largest eigenvalues are used to build the steering vector. In the preferred embodiment, we may assume that the propagation path is reciprocal, and, the same eigenvectors can be used to transmit and receive messages. The array weights, i.e. dominant eigenvectors, recorded in the table are used by the beamformer 40 to steer the energy of the beam. Since the steering only requires calculating the dominant eigenvectors corresponding to the largest eigenvalues, the step of eigen-decomposition is rapid, if one simply calculates the largest eigenvalues and eigenvectors. Thus, it is not necessary to calculate the full eigen-decomposition.

After computing eigenvalues, it is necessary to determine the direction of arrival of the client signal. Several approaches are known for calculating the direction of arrival, and any could be contemplated without departing from the invention. For example, in one aspect, the array radiation pattern is computed for the dominant eigenvector used as array weights and the signal peak is searched for as a function of angle. In the preferred embodiment, a complimentary projection operator is built from the computed eigenvector. An incident angle is then found corresponding to the maximum distance from the "subspace" defined by the dominant eigenvector and the "array manifold" defined by the separations of antenna elements in the antenna array.

The dominant eigenvector V is used to generate a matrix A such that:

$$A=VV^H$$

A "projection operator" P for A is found such that:

$$P=AA^H$$

which when operating on a general vector projects the vector onto the column space of the matrix A. The complimentary projection operator P' is given as:

$$P'=I-P$$

where I is the identity matrix. In this way, the complementary projection operation P', when operating on a general vector, projects the vector onto a space perpendicular to the column space of A. When the projection operator operates on the array manifold the resulting vector will have a maximum when the angle used to compute the array manifold is equal to the angle of incidence. When the complementary projection operator is used there will be a minimum at the angle of incidence. In this way, the incident angle of the client signal can be derived. The computed angle and the eigenvectors constitute the "spatial signature" for the client. These values are saved by the access point to assist in the forming of the steering vectors and determine which clients can access the channel at the same time. Alternatively to the above, Capon's method, MUSIC and ESPRIT, etc. could also be used to compute the angle of incidence.

Once the phase weighting factors are determined, the present directional array can be used to send and receive directed signals to and from clients. It can also be use to steer "signal nulls" in the direction of potential sources of interference. In either case, the present invention provides a space management solution for improving performance and throughput in a WLAN. In another aspect of the invention, the present antenna array can use the same implementation to provide "location based services," in order to locate and determine the position of a client. A signal is received from a client and the present array calculates the angle of arrival of the client signal in order to triangulate the client's position. Should the client not be transmitting at the time at which its location is desired, the client could be interrogated by an AP and made to transmit a signal in order to determine the clients location. In this way, it would be possible to determine the position of any client, e.g. a child in a public place with a suitable signal component. In this way, the present invention can also be adapted for applications other than WLAN, and can provide a level of safety and security.

As described hereinabove, the present invention provides improvements in efficiency and performance over previous type methods and implementations. However, it will be appreciated that various changes in the details, materials and arrangements of parts which have been herein described and illustrated in order to explain the nature of the invention may be made by those skilled in the area within the principle and scope of the invention will be expressed in the appended claims.

What is claimed:

1. A directional antenna system comprising:
   a plurality of RF nodes cooperatively forming a directional antenna array for transmitting and receiving wireless signals between a wireless client at a predetermined position in space;
   at least one network interface assembly for exchanging signals between the plurality of RF nodes and a network, wherein the plurality of RF nodes are distributed in space with respect to each other and the network interface assembly;
   wherein the plurality of RF nodes converts wireless signals from the wireless client to baseband signals that are sent to the at least one network interface assembly;
   wherein the plurality of RF nodes converts baseband signals from the at least one network interface assembly to wireless signals sent to the wireless client;
   wherein the at least one network interface comprises:
   a beamformer for applying a plurality of antenna weighting factors to the respective RF nodes, for introducing phase differences in the respective transmitted and received wireless signals that produce a directional steering vector for the wireless signals; and
   a processing arrangement for deriving an array manifold including a respective plurality of antenna weighting factors corresponding respectively to distances between each of the plurality of RF nodes, for producing the directional steering vector for the wireless signals.

2. The directional antenna system of claim 1, further comprising a local positioning system, the local positioning system comprises:
   a correlator respectively associated with each of the plurality of RF nodes, for measuring a signal time delay between each RF node, to thereby derive distance measurements between each RF node;
   wherein the correlator receives a long correlation signal from a second of the plurality of RF nodes and cross-correlates the long correlation signal with a copy of the long correlation signal maintained at each of the plurality of RF nodes; and
   wherein the correlator further comprising a plurality of taps for receiving a predetermined number of time sequenced points wherein the long correlation signal is processed in parallel and each predetermined point is forwarded to a respective tap which multiplies the respective point by the complex conjugate of the of the respective corresponding point maintained at the node, and wherein the sum of the products has a peak corresponding to the time delay in transmission from the second of the plurality of RF nodes.

3. The directional antenna system of claim 1 further comprising an adder between the beamformer and the network interface for summing the respective received signals with applied antenna weighting factors, for forwarding to the network.

4. The directional antenna system of claim 1 wherein each of the plurality of RF nodes comprises:
   an antenna for transmitting and receiving the wireless signals;

a radio assembly, comprising a local oscillator, for respectively modulating and demodulating the transmitted and received wireless signals;

a converter, comprising a clock, for respectively converting signals between analog wireless signals and digital network signals;

wherein the respective plurality of local oscillators and clocks are mutually coherent in frequency and phase.

5. The directional antenna system of claim 1 wherein the at least one network interface assembly comprises a PHY for exchanging signals with the plurality of radio nodes, and a MAC for converting the exchanged signals respectively to and from a network protocol.

6. The directional antenna system of claim 1 wherein the at least one network interface comprises a plurality of network interfaces, each of which for cooperating with at least one of the plurality of RF nodes.

7. The directional antenna system of claim 1 wherein each of the plurality of RF nodes comprises a wired connection for connecting to the at least one network interface.

8. The directional antenna system of claim 1 wherein the antenna weighting factors are calculated front a received client signal in order to triangulate the client's position.

* * * * *